Oct. 2, 1923.
C. J. ESCOTO
1,469,633
PROTECTIVE COVER FOR AUTOMOBILE TIRES
Filed Feb. 28, 1923    2 Sheets-Sheet 1
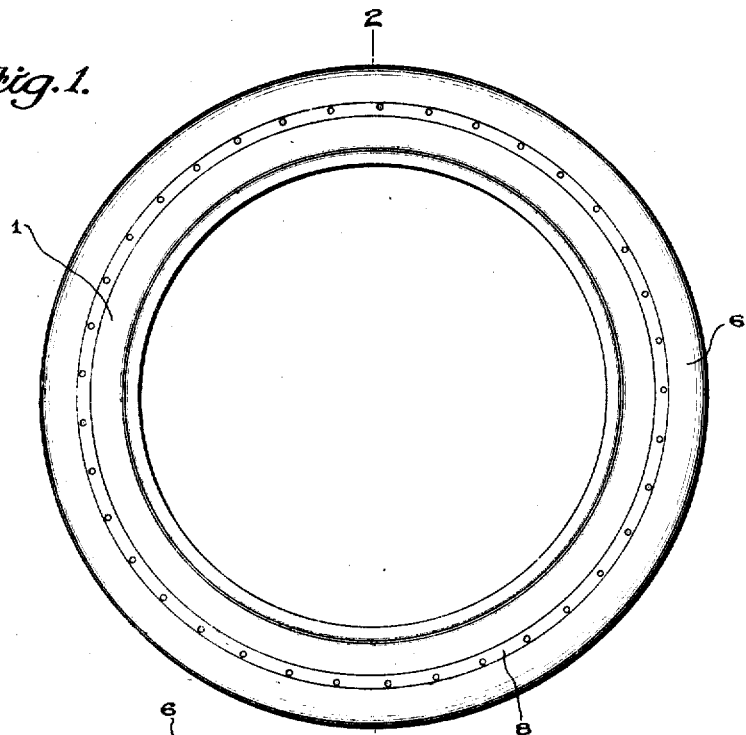
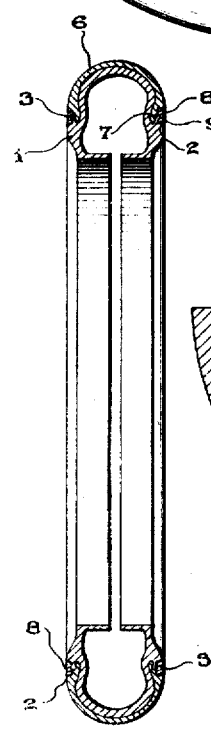
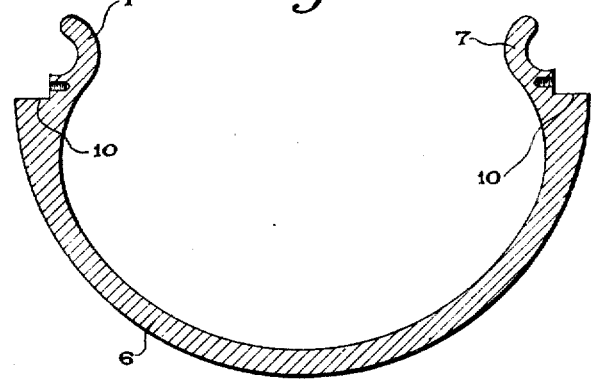
Carlos J. Escoto
INVENTOR

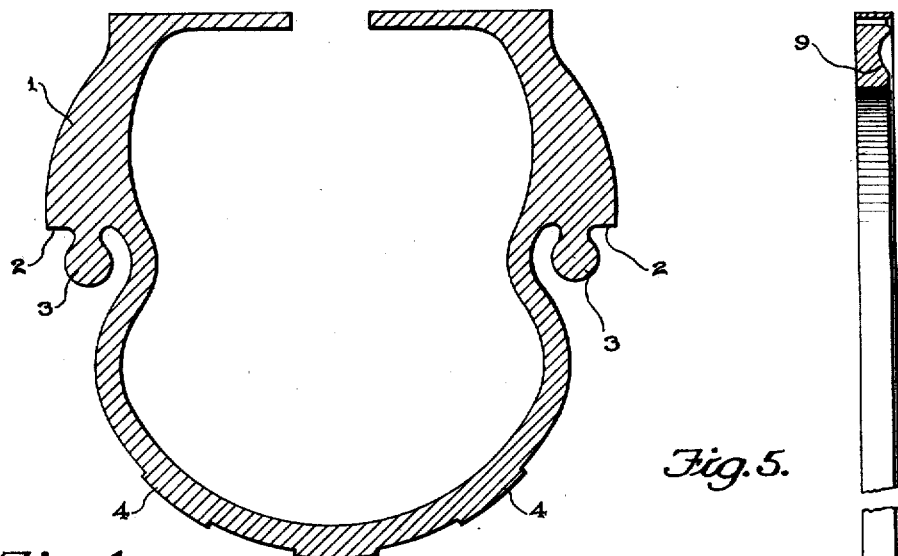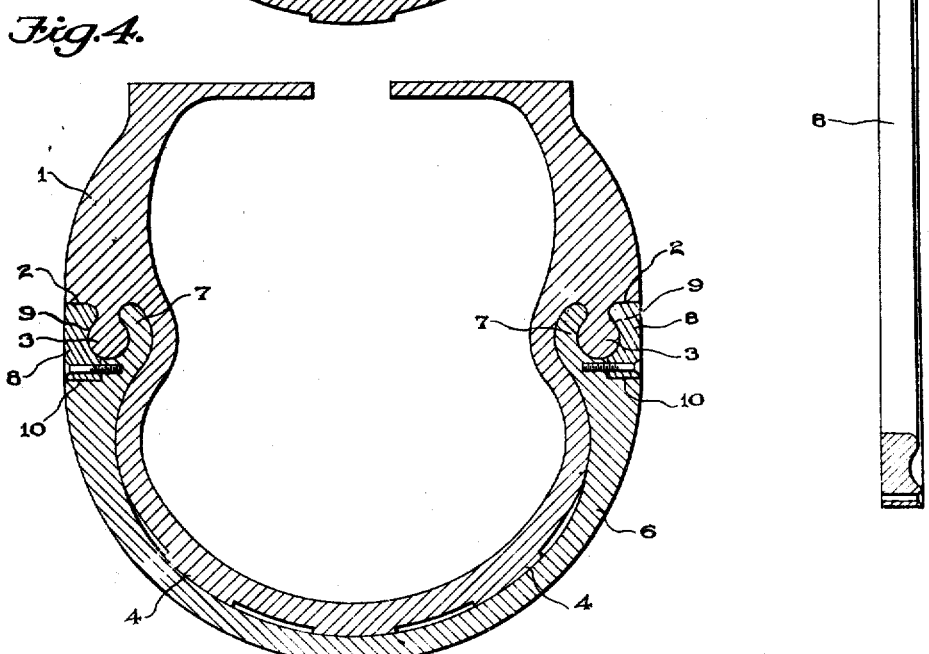

Patented Oct. 2, 1923.

1,469,633

UNITED STATES PATENT OFFICE.

CARLOS J. ESCOTO, OF HABANA, CUBA.

PROTECTIVE COVER FOR AUTOMOBILE TIRES.

Application filed February 28, 1923. Serial No. 621,866.

*To all whom it may concern:*

Be it known that I, CARLOS J. ESCOTO, a citizen of Cuba, residing at Habana, Cuba, have invented new and useful Improvements in Protective Covers for Automobile Tires, of which the following is a specification.

This invention relates to a protective device for a pneumatic tire, the general object of the invention being to provide a cover for the outer half of the tire which is formed of material which cannot be punctured and which is extended far enough to prevent damage from curbs and ruts.

Another object of the invention is to so form the tire and the protective device that the two can be securely fastened together.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts, throughout the several views, and in which:—

Figure 1 is an elevation of a tire constructed in accordance with my invention,

Figure 2 is a section on line 2—2 of Figure 1.

Figure 3 is a transverse sectional view of the tire itself.

Figure 4 is a similar view through the tire cover and its fastening means.

Figure 5 is a sectional view of one of the locking rings.

Figure 6 is a sectional view of the cover.

In these views 1 indicates the tire which may be formed of any suitable material and which may be fastened to the rim of a wheel in any desired manner. The inner side parts of the tire are made much thicker than the rest of the tire so as to form the recesses 2 at the sides of the tire and rounded beads 3 extend into these recesses and are connected with the thickened parts of the tire. The tread part of the tire may be provided with the annular projections 4. The protective cover 6 is of substantially semi-circular form in cross section so as to embrace the tread part of the tire and to extend over the side parts thereof to a point at the base of the beads, the edges of the cover being provided with the curved tongues 7 which engage the spaces between the beads and the thin side parts of the tire. Locking rings 8 are bolted to the edges of the cover and these plates are provided with the grooves 9 for engaging the outer parts of the beads, these rings engaging annular recesses 10 formed in the cover.

Thus the cover is firmly locked on the tire by means of the tongues 7 and the rings 8 engaging the beads 3 though the cover can be easily removed by taking off the rings 8 and deflating the tire so as to permit the cover to be pulled off the same.

It will be seen that the cover protects the outer part of the tire against punctures, cuts and the like and also prevents the sides from damage by being rubbed against curbs, the sides of ruts and the like.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A tire of the class described comprising a shoe, a cover engaging the outer part of the same, said cover being formed of non-flexible material, means for detachably connecting the cover to the tire, such means consisting of beads formed on the side walls of the shoe, tongues on the edges of the cover engaging the same and removable plates connected with the cover and engaging the outer parts of the beads.

2. In combination with a tire having recesses formed in its side walls, beads in said recesses formed integral with the tire, a cover of non-flexible material and of semi-circular shape in cross section, curved tongues at the edges of the cover for engaging the space between the beads and the walls of the recesses and locking plates detachably connected with the cover and having curved inner faces for engaging the outer faces of the beads.

In testimony whereof I affix my signature.

CARLOS J. ESCOTO.